June 26, 1956

A. C. HALTER 2,752,545

CONTROL SYSTEM UTILIZING MAGNETIC
AMPLIFIER FOR REFERENCE VOLTAGE

Filed Nov. 18, 1953

Inventor
Allan C. Halter
By Howard M. Herriot
Attorney

June 26, 1956

A. C. HALTER 2,752,545

CONTROL SYSTEM UTILIZING MAGNETIC
AMPLIFIER FOR REFERENCE VOLTAGE

Filed Nov. 18, 1953

Inventor
Allan C. Halter
by Howard M. Herriot
Attorney

United States Patent Office 2,752,545
Patented June 26, 1956

2,752,545

CONTROL SYSTEM UTILIZING MAGNETIC AMPLIFIER FOR REFERENCE VOLTAGE

Allan C. Halter, Milwaukee, Wis., assignor to Allis-Chalmers Manufacturing Company, Milwaukee, Wis.

Application November 18, 1953, Serial No. 392,811

5 Claims. (Cl. 318—7)

This invention relates in general to systems for obtaining a reference voltage from a magnetic amplifier and in particular to control systems for comparing a signal voltage and a reference voltage. More specifically, this invention relates to systems of the above type for rolling mills, wherein some machines, such as mill motors and their associated generators are connected in one power circuit, and others, such as entry reel or delivery reel dynamoelectric machines, are connected in other power circuits, and all the machines are controlled through control equipment connected to a common direct current control bus.

In prior art systems of this type, reference voltages are obtained by connecting a reference resistor in series with a dropping resistor and connecting this series combination across the direct current control bus. The reference resistor is then connected to an element in the power circuit which produces a signal voltage. These voltages are then compared and fed into a regulator for controlling a machine in the power circuit. These systems have the disadvantage that there is a considerable power loss in the dropping resistor. Another disadvantage of such systems is that there are substantial variations of the reference voltage in the reference resistor. Still another disadvantage is that the power circuit is connected to the direct current control bus and thus connected to other separate power circuits, such as the delivery reel loop or the entry reel loop, which are also controlled from and connected to the same bus.

It has been discovered that these disadvantages can be overcome by providing a magnetic amplifier having an input winding connected to the direct current control bus and a reactance winding connected to a load element for electrically isolating the load element from the control bus and for obtaining, with very little power loss, a reference voltage in the load element which is substantially free of variation.

It is therefore an object of this invention to provide means for producing a reference voltage without considerable power loss.

Another object of this invention is to provide means for producing a reference voltage in a load element and for electrically isolating the element from a direct current control bus.

A further object is to provide means for producing a reference voltage having substantially no variation.

Objects and advantages other than those above set forth will be apparent from the following description when read in conjunction with the drawing, in which.

Figure 1:
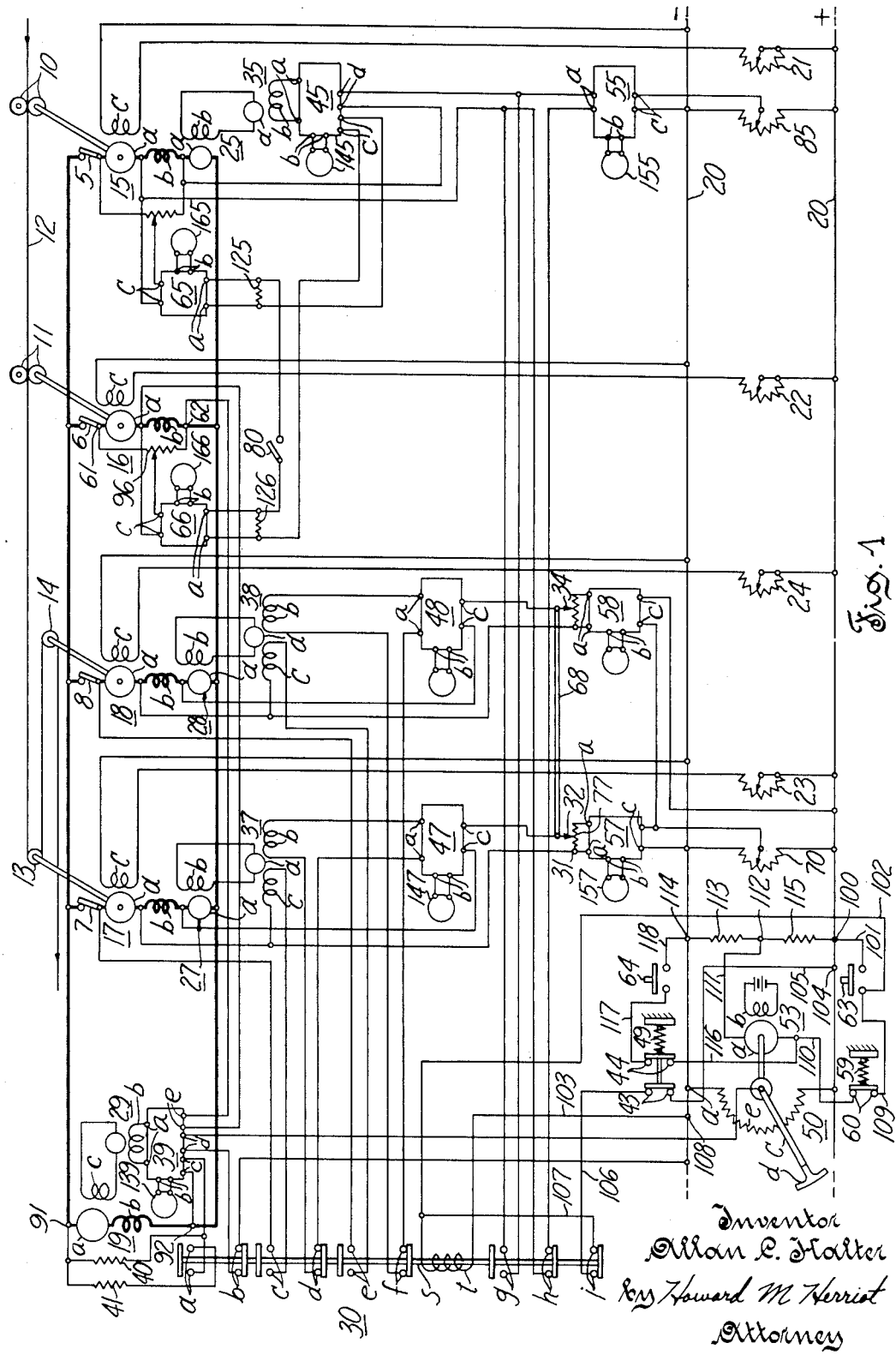
Fig. 1 shows the invention embodied in a control system for a rolling mill.

In the drawings, where an underlined reference numeral appears in proximity with a plurality of lower case reference letters, the numeral indicates a means comprising a plurality of elements and the elements are indicated by the lower case reference letters. In the specification, these elements are indicated by the reference numeral accompanied by the reference letter.

Referring to Fig. 1, rolls 10 of the first stand of the mill and rolls 11 of the second stand of the mill are adapted to move a strip 12 in the arrow direction of the mill. Delivery tension is provided by tension rolls 13 and 14.

The rolls 10, 11, 13 and 14 are driven by motors 15, 16, 17 and 18 respectively; these motors have armatures 15a, 16a, 17a and 18a, series field windings 15b, 16b, 17b and 18b, and separately excited field windings 15c, 16c, 17c and 18c. The separately excited field windings are energized from direct current control bus 20 and their energization may be regulated by rheostats 21, 22, 23 and 24 respectively.

A main generator 19 having an armature winding 19a, a series field winding 19b and a separately excited field winding 19c, supplies current to the motor armatures through main line switches 5, 6, 7 and 8. Booster generators 25, 27 and 28 have their armatures 25a, 27a and 28a connected in series with motor armatures 15a, 17a and 18a and connected between the main generator and each of these motor armatures. Each of the booster generators is supplied with a separately excited field winding 25b, 27b and 28b, the excitations of which determine the boosting or bucking effect of the booster generators. The booster generator field windings are energized by exciter generators 35, 37 and 38 having armatures 35a, 37a and 38a and separately excited field windings 35b, 37b and 37c, and 38b and 38c.

The voltage of main generator 19, and thus the speed of the motors, is regulated by controlling the energization of main generator field winding 19c by regulating the excitation of field winding 29b of exciter generator 29. Winding 29b is in turn controlled by the reversible direct current voltage output terminals 39a of saturable reactor or magnetic amplifier 39. This magnetic amplifier is supplied with alternating current at alternating current terminals 39b from a source such as an alternating current generator 139 and with regulating direct currents at regulating terminals 39c, 39d and 39e.

Figure 2:
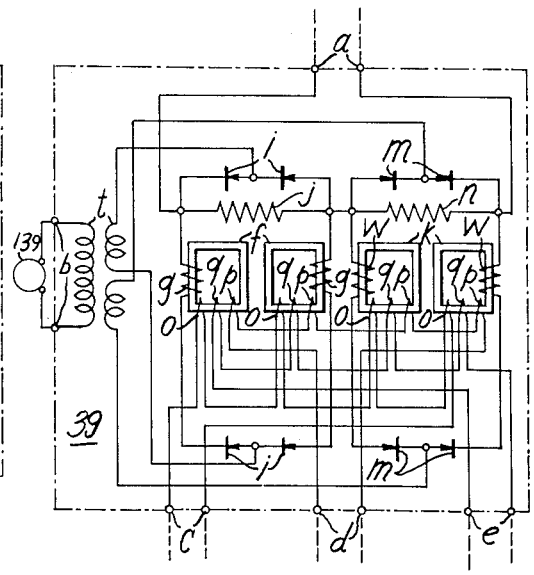
Fig. 2 shows, in more detail, a magnetic amplifier shown in Fig. 1.

Fig. 2 shows the arrangement of the cores, windings, rectifiers, resistors and transformers of amplifier 39. Referring to Fig. 2, magnetic amplifier 39 comprises a first pair of cores 39f having wound thereon reactance windings 39g each connected to be supplied from transformer 39t through rectifiers 39i with half wave rectified current to supply load resistor 39j with full wave rectified current, and a second pair of cores 39k having wound therein reactance windings 39w each connected to be supplied from the transformer through rectifiers 39m with half wave rectified current to supply load resistor 39n with full wave rectified current. Load resistors 39j and 39n are connected so that their voltage drops are opposed to provide a reversible direct current voltage output at terminals 39a. The transformer is connected to terminals 39b. Terminals 39c are connected to saturating direct current signal windings 39o wound on each of the cores; terminals 39d are connected to saturating direct current reference windings 39p also wound on each of the cores; and terminals 39e are connected to saturating direct current compensating windings 39q also wound on each of the cores. The direct current windings are wound and energized so that on each core windings 39p and 39q aid each other and oppose windings 39o.

Referring to Fig. 1 in conjunction with Fig. 2, terminals 39d are connected, through contacts 30b, across terminal 50a and contact arm 50c of motor operated rheostat 50. This rheostat is connected across bus 20. Motor 53, having armature 53a and field winding 53b, may drive the movable contact arm 50c rotatably along resistor 50e, clockwise or counterclockwise, depending upon the direction of current through armature 53a, to different positions on resistor 50e.

Thus magnetic amplifier 39 is energized at reference terminals 39d by a speed reference voltage which appears across movable contact arm 50c and terminal 50a of the rheostat 50. Signal terminals 39c are connected through resistor 40 to terminals 91, 92 and are thus energized by a signal voltage which is a portion of the voltage of the main generator 19. Compensating terminals 39e are connected across the series field winding 16b of motor 16 to be energized by a compensating voltage which is the IR voltage drop across field winding 16b of motor 16.

The amplifier 39 balances, having zero voltage output at terminals 39a when on each of the cores the ampere turns of speed reference windings 39p plus the ampere turns of compensating windings 39q are equal to the ampere turns of signal windings 39o. Amplifier 39 thus differentially compares a portion or measure of the voltage of the main generator with a speed reference voltage and, in order to compensate for changes in motor load, modulates the generator voltage by the IR voltage drop of mill motor 16.

With main line switches 5, 6, 7 and 8 closed, the mill may be started by depressing push button 63 which completes a circuit from the positive side of direct current bus 20 at terminal 100 through wire 101, wire 102, coil 30t of relay 30, and wire 103 to the negative side of bus 20 at terminal 108. Armature 30s of the relay is thus picked up to the position shown. Relay coil 30t is kept energized and thus the armature is held in this position by the closing of hold in contacts 30i to complete a hold in circuit from the positive side of bus 20 at terminal 104 through wire 105, contacts 43, wire 106, contacts 30i, wire 107, coil 30t, and wire 103 to negative terminal 108 on bus 20.

Depressing push button 63 also completes a circuit from positive terminal 100 through wire 101, wire 109, contacts 60, wire 110, through the armature 53a of motor 53, wire 111, terminal 112 and resistor 113 to the negative terminal 114. This causes motor 53 to rotate arm 50c counterclockwise, increasing the voltage supplied to reference terminals 39d of amplifier 39. This will cause amplifier 39 to have an output in the direction to give exciter 29 an output that increases the voltage of the main generator thus raising the speed of the mill. Releasing push button 63 stops arm 50c and amplifier 39 will balance when the portion of the generator voltage impressed on signal winding 39o is great enough to cause the ampere turns of that winding to equal those of windings 39p plus 39q. The voltage of the main generator is thus held at a voltage which runs the motors at a new speed corresponding to the new setting of arm 50c.

Depressing push button 64 completes a circuit from positive terminal 100 on bus 20 through resistor 115, wire 111, through armature 53a of motor 53, wire 116, contacts 44, wire 117, push button 64 and wire 118 to negative terminal 114. This causes motor 53 to rotate arm 53a clockwise and, in a manner the reverse of that explained above, a new lower speed setting is obtained.

If the voltage of the main generator and thus the speed of the mill should increase above the voltage corresponding to the preselected speed, the energization of signal terminals 39c will increase in response to the increase in generator voltage. Amplifier 39 will then have an output causing exciter 29 to decrease the voltage of the main generator to the value corresponding to the preselected speed. If the voltage of the main generator and thus the speed of the mill should decrease, this speed variation is corrected in a manner the reverse of that just explained.

Thus, by control of the main generator voltage through rheostat 50, amplifier 39 and exciter 29, the speed of the mill can be raised, lowered, set and maintained at preselected desired values.

The current in the delivery tension motor 17 is regulated and maintained at preselected values through saturable reactors or magnetic amplifiers 57 and 47, exciter generator 37 and booster generator 27. The current in the delivery tension motor 18 may similarly be regulated and maintained constant through saturable reactors or magnetic amplifiers 58 and 48, exciter generator 38 and booster generator 28.

Figure 3:
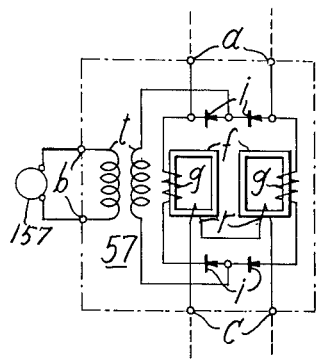
Fig. 3 shows, in more detail, another magnetic amplifier shown in Fig. 1.

Fig. 3 shows magnetic amplifier 57 comprising a pair of cores 57f having wound thereon reactance windings 57g each supplied from transformer 57t through rectifiers 57i with half wave rectified current and connected so as to supply full wave rectified current to output terminals 57a. The transformer is connected to alternating current terminals 57b. Regulating input terminals 57c are connected to regulating windings 57r wound on each of the cores 57f. Regulating windings 57r are wound and connected so that the current flowing therethrough tends to saturate cores 57f and thus increases the direct current voltage output at terminals 57a. Magnetic amplifier 58 is identical to magnetic amplifier 57.

Figure 4:
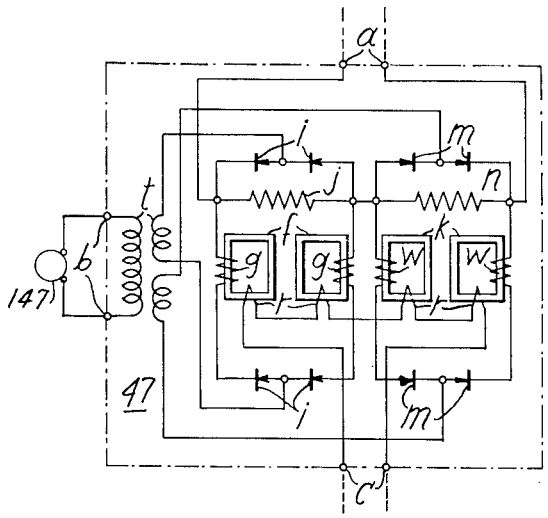
Fig. 4 shows, in more detail, a still different magnetic amplifier shown in Fig. 1.

Fig. 4 shows magnetic amplifier 47 comprising a first pair of cores 47f having wound thereon reactance windings 47g each connected to be supplied from transformer 47t through rectifiers 47i with half wave rectified current to supply load resistor 47j with full wave rectified current, and a second pair of cores 47k having wound thereon reactance windings 47w each connected to be supplied from the transformer through rectifiers 47m with half wave rectified current to supply load resistor 47n with full wave rectified current. Load resistors 47j and 47n are connected so that their voltage drops oppose each other to provide a reversible direct current voltage output at terminals 47a. The transformer is connected to terminals 47b. Regulating input terminals 47c are connected to regulating windings 47r wound on each of the cores 47f and 47k so that current flowing in one direction through windings 47r will tend to saturate one pair of cores and tend to desaturate the other pair to cause a voltage output of one polarity at terminals 47a, and that current flowing in the opposite direction through windings 47r will tend to saturate and desaturate the opposite pairs of cores to cause a voltage output of the opposite polarity at terminals 47a. Magnetic amplifier 48 is identical to magnetic amplifier 47.

Referring to Fig. 1 in conjunction with Figs. 3 and 4, magnetic amplifier 57 has its direct current input regulating terminals 57c connected to control bus 20 through rheostat 70. The terminals 57b are connected to a source of alternating current such as alternating current generator 157. A load element such as reference resistor 77 is connected to the direct current output terminals 57a to provide a reference voltage between terminal 31 and an adjusting means such as adjustable tap means 32. No other resistor is in series with resistor 77 and thus the reference voltage is obtained with little power loss and will be subject to substantially no variation. Resistor 77 is electrically isolated from control bus 20 by magnetic amplifier 57. The reference voltage is differentially compared with the IR voltage drop across series field winding 17b of motor 17 and the difference is a control voltage having a polarity dependent upon the relative magnitudes of the reference voltage and that voltage drop. The control voltage is fed into input terminals 47c of amplifier 47. Amplifier 47 is supplied with alternating current at terminals 47b from a source such as alternating current generator 147. Amplifier 47 amplifies any control voltage resulting from this differential comparison providing a reversible direct current voltage output at terminals 47a which is fed into field winding 37b of exciter 37 through contacts 30d. This voltage output is proportional to the control voltage and has a polarity dependent upon the polarity of the control voltage. This voltage output energizes field winding 37b causing exciter 37 to excite the field of booster generator 27, causing the booster generator to aid or oppose the voltage of the main generator to bring the current in motor armature 17a to and maintain it at the preselected desired value called for by the value of the reference voltage selected by the position of adjustable tap means 32 and the setting of rheostat 70.

For example, for a given setting of rheostat 70, adjustable tap means 32 may be moved to the left on resistor 77 to a point corresponding to a desired value of current lower than the value of current presently in armature 17a. The reference voltage is now lower than the IR voltage drop across series field winding 17b and the difference between these voltages produces a control voltage of a first polarity to energize windings 47r through terminals 47c to cause a voltage output of a first polarity at terminals 47a of amplifier 47. This voltage output energizes winding 37b, causing exciter generator 37 to excite booster generator 27 in a first direction causing the booster generator to oppose the voltage of the main generator to reduce the current in motor armature 17a. When the IR voltage drop across series field winding 17b equals the reference voltage, the regulating forcing effect stops, amplifier 47 balances, and the current equals the preselected desired value. Suppose now that the current decreases below the desired value. The IR voltage drop in the series field winding now will be less than the reference voltage and magnetic amplifier 47 will be oppositely energized by a control voltage of a polarity opposite the above described first polarity to produce at terminals 47a an output also of the opposite polarity than the above described first polarity to excite, through exciter generator 37, the booster generator in the direction opposite the above described first direction to cause the booster generator to aid the voltage of the main generator, increasing the current until the IR voltage drop across series field winding 17b again equals the reference voltage. The current has then been returned to the preselected desired value.

The current regulation for delivery tension motor 18 is accomplished in an identical manner as above explained but through magnetic amplifiers 58 and 48, exciter 38 and booster generator 28. Amplifier 58 compares to amplifier 57; amplifier 48 compares to amplifier 47; exciter 38 compares to exciter 37; and booster generator 28 compares to booster generator 27.

The desired division of load current between motors 17 and 18 is obtained by regulating rheostat 70. At midposition of its adjustable tap, amplifiers 57 and 58 receive equal energization. As the adjustable tap of rheostat 70 is moved from midposition, the energization of one increases and the other decreases. The setting of rheostat 70 thus selects and determines the ratio of the currents in motor armatures 17a, 18a.

Adjustable tap means 32 and 34 are ganged together by a linking means such as member 68 to increase or decrease simultaneously the value of currents to be maintained in motor armatures 17a, 18a. These adjustable tap means thus select and determine the value of the currents and maintain constant the above mentioned ratio of the currents.

The current in motor 15 is regulated and maintained at a preselected desired value by regulating the terminal voltage of motor 15 through booster generator 25, which aids or opposes the main generator voltage in response to the excitation of field winding 25b. Exciter generator 35 excites winding 25b. The exciter generator is in turn controlled by saturable reactor or magnetic amplifier 45.

Figure 5:
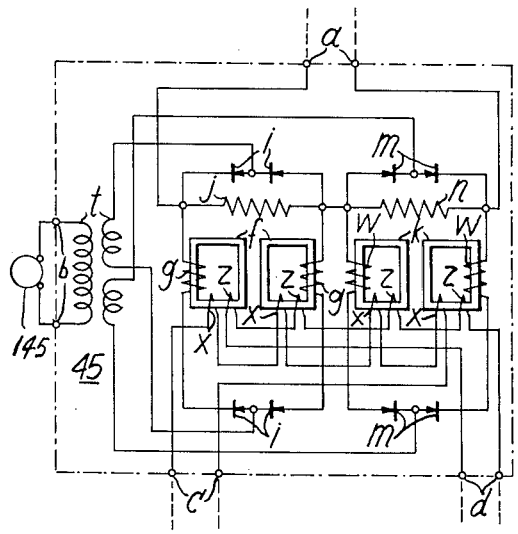
Fig. 5 shows, in more detail, still another magnetic amplifier shown in Fig. 1.

Magnetic amplifier 45, referring to Fig. 5, comprises a first pair of cores 45f having wound thereon reactance windings 45g each connected to be supplied from transformer 45t through rectifiers 45i with half wave rectified current to supply load resistor 45j with full wave rectified current, and a second pair of cores 45k having wound thereon reactance windings 45w each connected to be supplied from the transformer through rectifiers 45m with half wave rectified current to supply load resistor 45n with full wave rectified current. Load resistors 45j and 45n are connected so that their voltage drops oppose each other to provide a reversible direct current voltage output at terminals 45a. Transformer 45t is connected to alternating current terminals 45b. Direct current input terminals 45c are connected to saturating direct current windings 45x, and direct current input terminals 45d are connected to saturating direct current windings 45z. Windings 45x and 45z are each wound on each of the cores 45f and 45k so that current flowing in one direction in either of the windings 45x, 45z will tend to saturate one pair of cores and desaturate the other pair to cause an output voltage of one polarity at terminals 47a, and that current flowing in either of the windings 45x, 45z in the opposite direction will tend to saturate and desaturate the opposite pairs of cores to cause an output voltage at terminals 45a of the opposite polarity.

Magnetic amplifier 55 is identical to magnetic amplifiers 47 and 48 and is constructed as shown for amplifier 47 in Fig. 4.

Referring to Fig. 1 in conjunction with Fig. 5, terminals 55b are connected to an alternating current source such as alternating current generator 155. Output terminals 55a of magnetic amplifier 55 have thereacross a reference voltage dependent upon the voltage input to terminals 55c of the amplifier. The setting of rheostat 85, which is across direct current control bus 20, determines the voltage applied to input terminals 55c and thus determines the reference voltage across terminals 55a. The IR voltage drop across series field winding 15b is connected to oppose this reference voltage and the difference between these voltages is a control voltage which is impressed across the input terminals 45d of amplifier 45. Amplifier 45, which is connected to an alternating current source such as alternating current generator 145, compares the reference voltage across terminals 55a, corresponding to the preselected desired value of current in motor armature 15a, with the IR voltage drop across field winding 15b, corresponding to the actual value of current in armature 15a, and amplifies any resulting control voltage obtained to produce a direct current voltage output at output terminals 45a. The output voltage across terminals 45a is applied to field winding 35b of exciter 35, causing the exciter to energize winding 25b of booster generator 25. Booster generator 25 thus brings the current in motor armature 15a to the preselected desired value. The current in motor armature 15a is thus regulated and maintained in a manner similar to that described hereinbefore for motors 17 and 18.

During threading of strip 12 through rolls 10 and 11 of the first and second stands of the mill, switch 80 is closed to establish a speed matching control for maintaining the speed of mill motor 15 at the speed of mill motor 16. This control includes magnetic amplifiers 65, 66 and 45, and exciter generator 35. Magnetic amplifiers 65 and 66 are identical to magnetic amplifier 57 as shown in Fig. 3. Magnetic amplifier 45, shown in Fig. 5, has been heretofore described.

Resistor 96 is connected across terminals 61 and 62 including armature winding 16a and series field winding 16b of motor 16. Input terminals 66c of magnetic amplifier 66 are connected across the adjustable tap on resistor 96 and a point between field winding 16b and armature winding 16a of motor 16 to form a bridge circuit. This bridge circuit responds to the difference between the terminal voltage across armature winding 16a and the IR voltage drop in field winding 16b. The IR voltage drop in field winding 16b is proportional to the IR voltage drop in armature winding 16a. The bridge circuit thus responds differentially to the terminal voltage of and the IR voltage drop in the armature winding to produce across input terminals 66c a voltage proportional to the counter electromotive force of the armature winding when the armature current is in steady state. This bridge circuit, due to the quality of the inductance of field winding 16b to resist a change in current, produces across input terminals 66c a voltage proportional to the anticipated counter electromotive force of the armature winding of the motor when the current in armature winding 16a is changing. If the current through the motor armature winding and the series field winding decreases from a present value, the $$L\frac{di}{dt}$$

induced electromotive force of field winding 16b is in a direction opposing the IR voltage drop across the armature winding, and therefore the value of the voltage appearing across terminals 66c will be higher than the value of the actual counter electromotive force and proportional to an anticipated or greater counter electromotive force which will exist at a future lower value of current to be reached by the decrease in the present current. If the current in the circuit of armature winding 16a and field winding 16b increases from a present value, the $$L\frac{di}{dt}$$

induced electromotive force of winding 16b aids the IR voltage drop, and therefore the voltage appearing across terminals 66c will be less than the value of the actual counter electromotive force. The voltage across terminals 66c is thus proportional to an expected or anticipated lower value of counter electromotive force which will exist at a future higher value of current. The bridge circuit above described produces a first voltage which is a measure of the counter electromotive force of the armature winding of a motor and modulates that measurement in response to the rate of change of the current in the motor to produce a second voltage proportional to the anticipated counter electromotive force of the armature winding. Magnetic amplifier 66 thus responds to the anticipated counter electromotive force of motor 16. Magnetic amplifier 65, in a like manner, responds to the anticipated counter electromotive force of the armature winding 15a of motor 15. These amplifiers therefore respond very rapidly to speed changes of their respective motors. Magnetic amplifiers 65 and 66 are connected at terminals 65b, 66b, to alternating current sources such as alternating current generators 165, 166. The amplifiers 65, 66 are identical to magnetic amplifiers 57 and 58 and are constructed as shown for magnetic amplifier 57 in Fig. 3. The direct current output voltages of magnetic amplifiers 65 and 66, across resistors 125 and 126, are differentially compared and fed into input terminals 45c of magnetic amplifier 45. Any difference in the output voltages, which are proportional to the measured anticipated counter electromotive forces of the armature winding of motors 15 and 16, reflects an anticipated difference in the motor speeds, and thus booster generator 25 is excited through exciter 35 and magnetic amplifier 45. The booster generator aids or opposes the voltage of the main generator to keep motor 15 at the same speed as motor 16. Thus the speeds of motors 15 and 16 are matched to facilitate threading strip 12 through rolls 10 and 11. For example, if when threading a strip of material through the mill, the speed of motor 15 falls off due to an increased load on rolls 10, the current through armature 15a will increase. During this increase of current, because of the measuring circuit above described, the voltage across terminals 65c will be somewhat less than the actual counter electromotive force of motor 15 and will be proportional to an anticipated counter electromotive force of motor 15. The output of amplifier 65, in rapid response to the speed change, decreases to a value less than the value of the voltage output of amplifier 66, and so a voltage is impressed on terminals 45c of amplifier 45. Amplifier 45 thus energizes field winding 35b in the direction to cause exciter 35 to have an output through field winding 25b in a direction causing booster generator 25 to aid the voltage of main generator 19. This increases the speed and thus the counter electromotive force of motor 15. When the speed of motor 15 is increased to be equal to the speed of motor 16, the opposing voltage outputs of amplifiers 65 and 66 again balance. In this manner, the speed of motor 15 is maintained at the speed of motor 16 during the threading operation. When the strip has been threaded through the stands of the mill, switch 80 is opened to remove the speed matching control.

Means are provided to stop and start the mill without opening the main line switches 5, 6, 7 and 8. Arm 50c, when rotated clockwise to its limit at or near one end of resistor 50e, will open contacts 43 and 44, and, when rotated counterclockwise to its limit at or near the opposite end of resistor 50e, will open contacts 60. Contacts 43 and 44 are normally held closed by spring 49. Contacts 60 are normally held closed by spring 59.

To stop the mill, push button 64 is depressed and a circuit is completed as heretofore described from terminal 100 on the positive side of bus 20, through resistor 115, through motor armature 53, through contacts 44 to negative terminal 114 on the bus 20. Motor 53 thus rotates arm 50c clockwise and, with push button 64, held depressed, drives arm 50c to a point at or near one end of resistor 50e and element 50d opens contacts 43 and 44. Contacts 44, when opened, interrupt the circuit for energizing motor armature 53a through push button 64, and thus prevent damage to motor 53 by preventing the motor to work when stalled against spring 49. Contacts 43, when opened, interrupt the holding circuit for coil 30t and thus armature 30s drops out.

Contacts 30b open the circuit connecting amplifier terminals 39d and rheostat 50. This causes amplifier 39 to energize exciter 29 such that it excites main generator 19, reducing the main generator voltage toward zero. The residual magnetism of main generator 19, and of booster generators 25, 27 and 28, however, causes these generators to develop some voltage output which drives the motors causing slow turning or creeping of the motors. In most systems this creeping is overcome by opening the main line switches, but this is unnecessary in this system, as will be hereinafter explained.

When contacts 30b open, contacts 30a close to connect resistor 41 in parallel with resistor 40. This impresses across terminals 39c of amplifier 39 a greater portion of any existing generator voltage than the portion normally impressed thereacross solely through resistor 40. This gives a suicide effect to the voltage of generator 19 by causing amplifier 39 to more forcefully energize exciter 29 so as to more forcefully excite generator 19 to rapidly reduce the generator voltage to zero.

The dropping out of armature 30s also opens contacts 30d to open and make ineffective field winding 37b of exciter 37, preventing the booster generator from holding the current at a preselected operating value. Contacts 30c close to impress across field winding 37c any voltage existing across armature 17a of motor 17 causing exciter 37 to excite booster generator 27 to buck that voltage to zero. Field winding 37c is thereby substituted for field winding 37b and a suicide effect is given to any voltage across armature 17a to quickly overcome the voltage developed by the generators because of their residual magnetism and thus quickly stops motor 17.

Motor 18 is stopped in a manner identical to that described above for motor 17 because contacts 30f open to remove the effect of winding 38b of exciter 38 and contacts 30e close to energize winding 38c.

Motor 15 is also stopped in response to the dropping out of armature 30s of relay 30. When contacts 30h open, the reference voltage across terminals 55a is removed from the circuit of input terminals 45d of amplifier 45. Contacts 30g simultaneously close to impress across input terminals 45d of amplifier 45 any voltage existing across field winding 15b. This causes amplifier 45 to energize exciter 35, which in turn excites the booster generator causing it to quickly reduce the current in armature 15a to zero, thus quickly stopping the motor.

Motor 16, having no booster generator, is stopped when the voltage of main generator 19 is reduced to zero.

The mill is thus stopped without opening any main line switches, by removing the normal regulating circuits and establishing suicide circuits to counteract voltage developed by the generators because of their residual magnetism.

The mill is started by depressing pushbutton 63 which as heretofore described picks up armature 30s to reestablish the normal regulating circuit. The mill can be brought up to the desired speed by holding pushbutton 63 depressed and releasing the pushbutton when that speed is reached. Long continued depression of pushbutton 63 rotates arm 50c to a point at or near the end of resistor 50e and element 50d opens limit contacts 60 to prevent the mill from exceeding an upper limit speed. The opening of contacts 60 also prevents motor 53 from being damaged by interrupting the energizing circuit of armature 53a through pushbutton 63 so that continued depression of pushbutton 63 will not actuate the motor causing it to work when stalled against spring 59.

Features disclosed but not claimed herein are claimed in my copending applications, Serial Nos. 392,810 and 392,945, filed November 18, 1953.

It will be apparent to one skilled in the art that various changes and modifications may be made in the embodiments of this invention herein described and illustrated without departing from the spirit of the invention or from the scope of the appended claims.

It is claimed and desired to secure by Letters Patent:

1. In a control system for maintaining constant a first current in the first armature winding and first series field winding of a first motor and a second current in the second armature winding and second series field winding of a second motor, a first control generator for controlling said first current, a first rectifier, a first resistor, a first magnetic amplifier having a first input winding and a first reactance winding, a source of direct current, means connecting said first input winding to said source of direct current, means connecting said first reactance winding to a source of alternating current through said first rectifier and said first resistor for producing in said first resistor a first reference voltage, first regulating means responsive to the difference of said first reference voltage and the voltage drop across said first series field winding for energizing said first control generator to maintain said first current substantially constant, a second control generator for controlling said second current, a second rectifier, a second resistor, a second magnetic amplifier having a second input winding and a second reactance winding, means connecting said second input winding to said source of direct current, means connecting said second reactance winding to said source of alternating current through said second rectifier and said second resistor for producing in said second resistor a second reference voltage, second regulating means responsive to the difference of said second reference voltage and the voltage drop across said second series field winding for energizing said second control generator to maintain said second current substantially constant, a rheostat connected to said source of direct current and to said first and second input windings for determining the ratio of said first current to said second current, first adjusting means for said first resistor for determining the magnitude of said first current, second adjusting means for said second resistor for determining the magnitude of said second current, and linking means for said first and second adjusting means for simultaneously operating said adjusting means to maintain said ratio constant.

2. In a control system for maintaining constant a first current in the first armature winding and first series field winding of a first motor and a second current in the second armature winding and second series field winding of a second motor, a first control generator for controlling said first current, a first rectifier, a first resistor, a first magnetic amplifier having a first input winding and a first reactance winding, a source of direct current, means connecting said first input winding to said source of direct current, means connecting said first reactance winding to a source of alternating current through said first rectifier and said first resistor for producing in said first resistor a first reference voltage, first regulating means responsive to the difference of said first reference voltage and the voltage drop across said first series field winding for energizing said first control generator to maintain said first current substantially constant, a second control generator for controlling said second current, a second rectifier, a second resistor, a second magnetic amplifier having a second input winding and a second reactance winding, means connecting said second input winding to said source of direct current, means connecting said second reactance winding to said source of alternating current through said second rectifier and said second resistor for producing in said second resistor a second reference voltage, second regulating means responsive to the difference of said second reference voltage and the voltage drop across said second series field winding for energizing said second control generator to maintain said second current substantially constant, and a rheostat connected to said source of direct current and to said first and second input windings for determining the ratio of said first current to said second current.

3. In a control system for maintaining constant a first current in the first armature winding and first series field winding of a first motor and a second current in the second armature winding and second series field winding of a second motor, a first control generator for controlling said first current, a first rectifier, a first resistor, a first magnetic amplifier having a first input winding and a first reactance winding, a source of direct current, means connecting said first input winding to said source of direct current, means connecting said first reactance winding to a source of alternating current through said first rectifier and said first resistor for producing in said first resistor a first reference voltage, first regulating means responsive to the difference of said first reference voltage and the voltage drop across said first series field winding for energizing said first control generator to maintain said first current substantially constant, a second control generator for controlling said second current, a second rectifier, a second resistor, a second magnetic amplifier having a second input winding and a second reactance winding, means connecting said second input winding to said source of direct current, means connecting said second reactance winding to said source of alternating current through said second rectifier and said second resistor for producing in said second resistor a second reference voltage, second regulating means responsive to the difference of said second reference voltage and the voltage drop across said second series field winding for energizing said second control generator to maintain said second current substantially constant, first adjusting means for said first resistor for determining the magnitude of said first current, second adjusting means for said second resistor for determining the magnitude of said second current, and linking means for said first and second adjusting means for simultaneously operating said adjusting means to maintain said ratio constant.

4. In a control system for maintaining constant the current in the armature winding and the series field winding of a motor having said windings connected in series with the armature winding of a booster generator, an exciter generator for controlling the excitation of said booster generator, a first magnetic amplifier for controlling the excitation of said exciter generator, a rectifier, a resistor, a second magnetic amplifier having an input winding and a reactance winding, means connecting said input winding to a source of direct current, means connecting said reactance winding to a source of alternating current through said rectifier and said resistor for producing in said resistor a reference voltage, and means connecting said resistor to said field winding and said first magnetic amplifier to energize said first magnetic amplifier in response to the difference in said reference voltage and the voltage drop in said field winding for maintaining the current in said motor windings substantially constant.

5. In a control system for maintaining constant the current in the armature winding and the series field winding of a motor having said windings connected in series with the armature winding of a booster generator, an exciter generator for controlling the excitation of said booster generator, a rectifier, a resistor, a magnetic amplifier having an input winding and a reactance winding, means connecting said input winding to a source of direct current, means connecting said reactance winding to a source of alternating current through said rectifier and said resistor for producing in said resistor a reference voltage, and regulating means responsive to the difference of said reference voltage and the voltage drop across said field winding for controlling said exciter generator to maintain said current substantially constant.

References Cited in the file of this patent

UNITED STATES PATENTS

| | | |
|---|---|---|
| 2,229,952 | Whiteley et al. | Jan. 28, 1941 |
| 2,456,938 | Harder | Dec. 21, 1948 |
| 2,632,145 | Sikorra | Mar. 17, 1953 |